(12) United States Patent
Tanaka et al.

(10) Patent No.: US 12,131,840 B2
(45) Date of Patent: Oct. 29, 2024

(54) ELECTRICALLY INSULATED CABLE

(71) Applicant: SUMITOMO ELECTRIC INDUSTRIES, LTD., Osaka (JP)

(72) Inventors: Shigeyuki Tanaka, Osaka (JP); Yutaka Matsumura, Osaka (JP); Taro Fujita, Osaka (JP); Takumi Ooshima, Kanuma (JP); Jo Yagisawa, Kanuma (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 197 days.

(21) Appl. No.: 17/765,186

(22) PCT Filed: Oct. 30, 2019

(86) PCT No.: PCT/JP2019/042626
§ 371 (c)(1),
(2) Date: Mar. 30, 2022

(87) PCT Pub. No.: WO2021/084656
PCT Pub. Date: May 6, 2021

(65) Prior Publication Data
US 2023/0034227 A1 Feb. 2, 2023

(51) Int. Cl.
| *H01B 3/44* | (2006.01) |
| *B60R 16/03* | (2006.01) |
| *B60T 17/00* | (2006.01) |
| *H01B 7/00* | (2006.01) |
| *H01B 7/18* | (2006.01) |
| *H01B 7/295* | (2006.01) |

(52) U.S. Cl.
CPC ............ *H01B 3/441* (2013.01); *B60R 16/03* (2013.01); *B60T 17/00* (2013.01); *H01B 7/0009* (2013.01); *H01B 7/18* (2013.01); *H01B 7/295* (2013.01)

(58) Field of Classification Search
None
See application file for complete search history.

(56) References Cited

U.S. PATENT DOCUMENTS

| 2001/0009198 A1* | 7/2001 | Belli ..................... H01B 7/28 174/110 R |
| 2007/0187134 A1* | 8/2007 | Detian ................. H01B 11/20 174/126.1 |
| 2010/0218970 A1* | 9/2010 | Eshima ............... H01B 13/141 174/108 |
| 2011/0036613 A1* | 2/2011 | Hayashishita ......... H01B 3/445 174/105 R |
| 2013/0264112 A1* | 10/2013 | Xu ....................... H01B 7/207 174/102 R |

(Continued)

FOREIGN PATENT DOCUMENTS

| JP | 2001-052535 A | 2/2001 |
| JP | 2009-84373 A | 4/2009 |

(Continued)

*Primary Examiner* — Krystal Robinson
(74) *Attorney, Agent, or Firm* — Oliff PLC (57) ABSTRACT

An electrically insulated cable including: a core electric wire; and a covering layer covering the core electric wire; wherein: the core electric wire includes a plurality of insulated wires; the insulated wires each include a conductor and an insulating layer covering the conductor; and the covering layer contains a crosslinked polyethylene-based resin and a flame retardant in the front surface side thereof.

18 Claims, 4 Drawing Sheets

(56) References Cited

U.S. PATENT DOCUMENTS

| | | | |
|---|---|---|---|
| 2014/0326480 A1* | 11/2014 | Hashimoto | H01B 7/295 |
| | | | 174/113 R |
| 2015/0096785 A1* | 4/2015 | Hayashishita | H01B 11/20 |
| | | | 174/113 R |
| 2015/0165988 A1* | 6/2015 | Hayakawa | H01B 3/54 |
| | | | 188/158 |
| 2016/0155540 A1* | 6/2016 | Matsuda | H01B 3/004 |
| | | | 174/107 |
| 2017/0004906 A1 | 1/2017 | Tanaka et al. | |
| 2017/0309373 A1* | 10/2017 | Tanaka | H01B 7/30 |
| 2018/0182511 A1* | 6/2018 | Tanaka | H01B 3/307 |
| 2020/0168359 A1* | 5/2020 | Kohori | H01B 7/0869 |
| 2021/0005347 A1 | 1/2021 | Matsumura et al. | |
| 2021/0343447 A1 | 11/2021 | Matsumura et al. | |
| 2023/0094637 A1* | 3/2023 | Murayama | H01B 11/002 |
| | | | 174/115 |

FOREIGN PATENT DOCUMENTS

| | | |
|---|---|---|
| JP | 2015-156386 A | 8/2015 |
| JP | 2016-222875 A | 12/2016 |
| WO | 2015/159788 A1 | 10/2015 |
| WO | 2019/171644 A1 | 9/2019 |

\* cited by examiner

ELECTRICALLY INSULATED CABLE

TECHNICAL FIELD

The present disclosure relates to an electrically insulated cable.

BACKGROUND ART

Electric parking brake (EPB) systems to be mounted on vehicles each use an electrically insulated cable (a cable for EPB) that electrically connects a caliper in a wheel house and an electronic control unit on the body side of a vehicle.

CITATION LIST

Patent Literature

PTL 1: Japanese Patent Laying-Open No. 2015-156386

SUMMARY OF INVENTION

The electrically insulated cable of the present disclosure comprises:
a core electric wire; and
a covering layer covering the core electric wire;
wherein:
the core electric wire includes a plurality of insulated wires;
the insulated wires each include a conductor and an insulating layer covering the conductor; and
the covering layer contains a crosslinked polyethylene-based resin and a flame retardant in the front surface side thereof.

DETAILED DESCRIPTION

Problem to be Solved by the Present Disclosure

Japanese Patent Laying-Open No. 2015-156386 (PTL 1) discloses an electrically insulated cable comprising: a core electric wire formed by twisting a plurality of core materials including a conductor and an insulating layer formed so as to cover the conductor; a first covering layer formed so as to cover the core electric wire; a second covering layer formed so as to cover the first covering layer; and a tape member arranged, between the core electric wire and the first covering layer, in a state of winding around the core electric wire; wherein: the second covering layer is formed of a flame-retardant polyurethane-based resin, and the cross-sectional area of each of the conductors is in the range of 0.18 to 3.0 mm$^2$.

The second covering layer in the electrically insulated cable of PTL 1 is formed of a flame-retardant polyurethane-based resin. The electrically insulated cable of PTL 1 having such a configuration has an excellent flexing resistance, but when the covering layer is removed by inserting a blade thereinto and tearing it off to expose the core material (insulated wire), it is necessary to apply a large load to tear off the covering layer. Therefore, there has been room for improvement in terms of workability.

The end of the electrically insulated cable is sometimes provided with water shut-off properties by using a rubber stopper. In this case, for the electrically insulated cable of PTL 1, the covering layer in the electrically insulated cable tends to be easily changed in shape due to the compression by the rubber stopper, and there has therefore been room for improvement in terms of shape retention.

The present disclosure has been made in view of the above circumstances, and an object of the present invention is to provide an electrically insulated cable excellent in workability and an excellent shape retention.

Advantageous Effect of the Present Disclosure

According to the present disclosure, it is possible to provide an electrically insulated cable having an excellent workability and an excellent shape retention.

Description of Embodiments

First, implementations of the present disclosure will be listed and described.

[1] The electrically insulated cable according to one aspect of the present disclosure comprises:
a core electric wire; and
a covering layer covering the core electric wire;
wherein:
the core electric wire includes a plurality of insulated wires;
the insulated wires each include a conductor and an insulating layer covering the conductor; and
the covering layer contains a crosslinked polyethylene-based resin and a flame retardant in the front surface side thereof.

In the electrically insulated cable of the present disclosure, the covering layer contains a crosslinked polyethylene-based resin and a flame retardant in the front surface side thereof. Therefore, the covering layer has an appropriate tensile strength and the electrically insulated cable is thereby excellent in workability. In addition, the covering layer is excellent in creep characteristics and the electrically insulated cable is thereby excellent in shape retention. That is, the electrically insulated cable has an excellent workability and an excellent shape retention. In the present embodiment, the term "workability" means the ease of making a work to a covering layer constituting an electrically insulated cable. The term "shape retention" means a resistance to shape change in the covering layer when an external force is applied.

[2] The covering layer has a tensile strength of no less than 8 MPa and no more than 20 MPa. By defining in this way, the electrically insulated cable becomes further excellent in workability.

[3] The covering layer has a ratio of the elastic modulus at 150° C. to the elastic modulus at 200° C. of 1.5 or less. By defining in this way, the electrically insulated cable becomes further excellent in shape retention.

[4] The crosslinked polyethylene-based resin may comprise an ethylene-vinyl acetate copolymer or an ethylene-ethyl acrylate copolymer. By defining in this way, the electrically insulated cable can have a good extrusion processability.

[5] The flame retardant is a bromine-based flame retardant. By defining in this way, the electrically insulated cable can have excellent flame retardant properties.

[6] The covering layer includes a first sheath layer covering the core electric wire and a second sheath layer covering the first sheath layer; and the second sheath layer contains the crosslinked polyethylene-based resin and the flame retardant. By defining in this way, the electrically insulated cable can have excellent flame retardant properties and an excellent flexibility.

[7] The cross-sectional area of the conductor in each of the insulated wires is no less than 1 mm² and no more than 3 mm². By defining in this way, the electrically insulated cable can have excellent electrical characteristics and an excellent flexibility while maintaining a small diameter.

[8] The conductor includes no less than 196 and no more than 2450 element wires; and each of the element wires has a diameter of no less than 40 μm and no more than 100 μm. By defining in this way, the electrically insulated cable can have an excellent flexing resistance.

[9] The electrically insulated cable is an electrically insulated cable to be mounted on a vehicle. The electrically insulated cable can be suitably used to be mounted on a vehicle.

[10] The electrically insulated cable is an electrically insulated cable for an electric parking brake. The electrically insulated cable can be suitably used for an electric parking brake.

[11] The electrically insulated cable is an electrically insulated cable for an antilock brake system. The electrically insulated cable can be suitably used for an antilock brake system.

Details of Embodiments

Hereinafter, embodiments of the present disclosure (hereinafter referred to as "the present embodiment") will be described. However, the present embodiments are not limited thereto. As used herein, the expression in the form of "A to Z" means the upper limit and the lower limit of a range (that is, no less than A and no more than Z), and when there is no description of the unit for A and the unit is described only for Z, the unit for A is the same as the unit of Z.

<<Electrically Insulated Cable>>

The electrically insulated cable according to the present disclosure (hereinafter sometimes referred to only as "electrically insulated cable") comprises:

a core electric wire; and
a covering layer covering the core electric wire;
wherein:
 the core electric wire includes a plurality of insulated wires;
 the insulated wires each include a conductor and an insulating layer covering the conductor; and
 the covering layer contains a crosslinked polyethylene-based resin and a flame retardant in the front surface side thereof.

Figure 1:
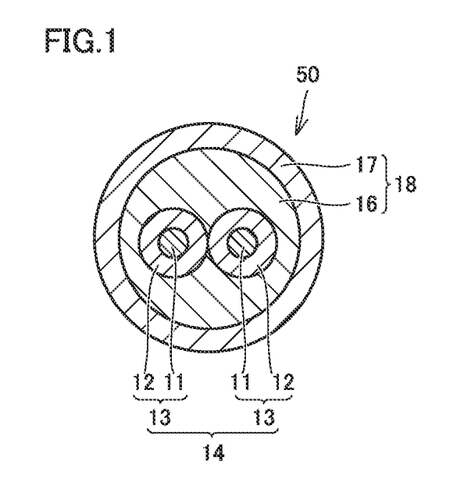
FIG. 1 is a cross-sectional view showing a configuration of an embodiment of the electrically insulated cable of the present disclosure.

FIG. 1 is a cross-sectional view showing a configuration of an embodiment of the electrically insulated cable of the present disclosure. An electrically insulated cable 50 shown in FIG. 1 is used, for example, for an electric parking brake. Electrically insulated cable 50 comprises a core electric wire 14 and a covering layer 18 covering core electric wire 14. In FIG. 1, core electric wire 14 includes two insulated wires 13. Insulated wire 13 includes a conductor 11 and an insulating layer 12 covering conductor 11. Covering layer 18 may include a first sheath layer 16 covering core electric wire 14 and a second sheath layer 17 covering first sheath layer 16.

Figure 4:
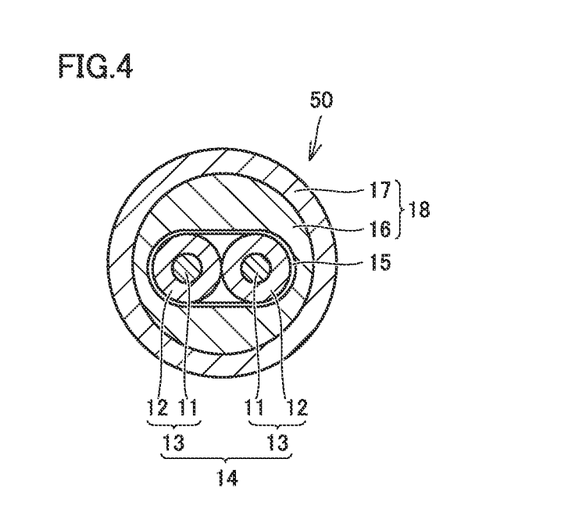
FIG. 4 is a cross-sectional view showing a configuration of further another embodiment of the electrically insulated cable of the present disclosure.

In one aspect of the present embodiment, electrically insulated cable 50 may further comprise a tape member 15 covering core electric wire 14 (see FIG. 4). At this time, two insulated wires 13 may be bundled by winding tape member 15 around insulated wires 13 on the outer circumference thereof. Hereinafter, each of the components constituting the electrically insulated cable will be described.

<Core Electric Wire>

The core electric wire includes a plurality of insulated wires. In other words, it can also be understood that an assembly of a plurality of insulated wires is a core electric wire. The core electric wire may be, for example, a twisted wire formed by twisting a plurality of insulated wires.

The number of the insulated wires constituting the core electric wire is not particularly limited, but may be, for example, two, four or six. The diameters (outer diameters) of the plurality of insulated wires constituting the core electric wire may be each the same or different. For example, two or more insulated wires each having the same diameter may be twisted together to form a core electric wire (for example, FIG. 1). As used herein, the term "the same" is intended to include not only "completely the same" but also "substantially the same". A plurality of insulated wires having different diameters may be twisted together to form a core electric wire (for example, FIG. 2).

The core electric wire can include insulated wires for two or more applications. For example, insulated wires (two or more) for EPB having substantially the same diameter can be twisted together with an insulated wire(s) for a signal or grounding having a diameter smaller than the diameter of the insulated wire for EPB to form a single core electric wire.

(Insulated Wire)

The insulated wire includes a conductor and an insulating layer covering the conductor. The term "conductor" as used in the present embodiment means a wire material comprised of a material having electrical conductivity, ductility and malleability. The material constituting the conductor is not particularly limited, but examples thereof include copper, aluminum, a copper alloy, tin-plated copper and an aluminum alloy. The conductor may be a single element wire or a twisted wire formed by twisting a plurality of (tens to thousands of) element wires together. The conductor may be also a twisted twisted wire formed by further twisting such twisted wires together.

The conductor preferably includes no less than 196 and no more than 2450 element wires and more preferably no less than 294 and no more than 2000 element wires. Each of the element wires has a diameter of no less than 40 μm and no more than 100 μm and more preferably no less than 50 μm and no more than 90 μm. In one aspect of the present embodiment, the conductor may include no less than 196 and no more than 2450 element wires; and each of the element wires may have a diameter of no less than 40 μm and no more than 100 μm. The "diameter of element wires" means the "average diameter of element wires" as calculated according to the method described later. The number of the element wires included in the conductor and the diameter of the element wires are preferably selected so as to meet a suitable range of the cross-sectional area of the above conductor described later.

When the electrically insulated cable is used for power supply applications (for example, when used as a cable for EPB), the cross-sectional area of the conductor (in the case of being composed of a plurality of element wires, the total cross-sectional area thereof) is preferably no less than 1 mm$^2$ and no more than 3 mm$^2$, and more preferably no less than 1.6 mm$^2$ and no more than 2.5 mm$^2$.

When the electrically insulated cable is used for signal line applications (for example, when used as a cable for ABS), the cross-sectional area of the conductor is preferably no less than 0.13 mm$^2$ and no more than 0.5 mm$^2$, and more preferably no less than 0.18 mm$^2$ and no more than 0.35 mm$^2$. The cross-sectional area of the conductor can be determined by the following procedure. First, the diameter of each of the element wires (approximately 5 element wires) is measured using a micrometer gauge or the like, and the "average diameter of element wires" is calculated by averaging the diameters measured from each of the element wires. Next, the cross-sectional area per element wire is calculated from the calculated average diameter of element wires. At this time, the cross section perpendicular to the longitudinal direction of the element wire is assumed to be a circle to calculate the cross-sectional area thereof. The cross-sectional area of the conductor is determined by multiplying the calculated cross-sectional area by the number of element wires constituting the conductor.

Examples of the material constituting the insulating layer include a polyolefin-based resin. The polyolefin-based resin is preferably a flame-retardant polyolefin-based resin. The flame-retardant polyolefin-based resin can be produced, for example, by blending a conventional polyolefin-based resin with a flame retardant. Due to the insulating layer being composed of the flame-retardant polyolefin-based resin, the flame retardant properties and the insulating properties of the core electric wire (insulated wire) can be ensured, even when a part of the core electric wire (insulated wire) is exposed by removing the covering layer.

Examples of the polyolefin-based resin include, but not limited to, a high-density polyethylene (HDPE), a low-density polyethylene (LDPE), a linear low-density polyethylene (LLDPE), a very low-density polyethylene (VLDPE), an ethylene-vinyl acetate copolymer resin (EVA), an ethylene-methyl acrylate copolymer resin (EMA) and an ethylene-ethyl acrylate copolymer resin (EEA). Examples of the material constituting the insulating layer also include other materials such as a fluorine-based resin.

In the case of an insulated wire used for a cable for EPB, the thickness of the insulating layer is preferably no less than 0.2 mm and no more than 0.8 mm, and more preferably no less than 0.25 mm and no more than 0.7 mm. As used herein, the "thickness of the insulating layer" means the shortest distance from the inner wall of the insulating layer to the outer wall of the insulating layer. The thickness of the insulating layer can be determined as follows. First, for arbitrarily selected 10 points in the insulating layer, the thickness of the insulating layer at each of the selected 10 points is measured using a slide caliper or a micrometer gauge. Next, the value calculated by averaging the thicknesses measured at each point is taken as the thickness of the insulating layer.

The outer diameter of the insulated wire is preferably no less than 2.5 mm and no more than 4 mm and more preferably no less than 2.5 mm and no more than 3.8 mm. The outer diameter of the insulated wire can be measured, for example, with a slide caliper.

<Covering Layer>

The covering layer of the present disclosure covers the core electric wire. In one aspect of the present embodiment, the covering layer may cover the outer circumference of the core electric wire bundled by the tape member described later (see FIG. 4). The covering layer protects the core electric wire. That is, the covering layer is required to be flexible to ensure resistance to stone splash or the like during driving a motor vehicle (impact resistance) and flexibility of the electrically insulated cable. The covering layer is also required to have an excellent flexing resistance or the like so as not to cause deterioration, such as disconnection and increase in resistance, of the conductor due to repeated flexing during traveling.

In the present embodiment, the covering layer contains a crosslinked polyethylene-based resin and a flame retardant in the front surface side thereof. The "front surface side of the covering layer" means a region sandwiched between a line connecting intermediate points in the thickness direction of the covering layer and a line representing the outer edge of the covering layer, in the cross section perpendicular to the longitudinal direction of the electrically insulated cable. In one aspect of the present embodiment, the above-described "line connecting intermediate points" can be understood to be a set of the intermediate points.

In the present embodiment, the "crosslinked polyethylene-based resin" means a resin in which a covalent bond (such as a C—C bond) is formed between molecular chains of a polyethylene-based resin, by irradiating the polyethylene-based resin with a radiation such as an electron beam, or by adding a crosslinking agent to the polyethylene-based resin, or by binding an alkoxysilyl group or the like to the polyethylene-based resin to cause a reaction.

Examples of the polyethylene-based resin used for the crosslinked polyethylene-based resin can include, but not limited to, a high-density polyethylene (HDPE), a low-density polyethylene (LDPE), a linear low-density polyethylene (LLDPE) and a very low-density polyethylene (VLDPE).

In the present embodiment, the polyethylene-based resin may comprise a copolymer of an α-olefin having a carbonyl group and ethylene. As used herein, the "α-olefin" means an alkene having a carbon-carbon double bond at the α-position. Examples of the α-olefin having a carbonyl group can include an alkyl (meth)acrylate such as methyl (meth)acrylate or ethyl (meth)acrylate; aryl (meth)acrylate such as phenyl (meth)acrylate; a vinyl ester such as vinyl acetate and vinyl propionate; an unsaturated acid such as (meth)acrylic acid, crotonic acid, maleic acid or itaconic acid; a vinyl ketone such as methyl vinyl ketone or phenyl vinyl ketone; and (meth)acrylic amide. Among them, alkyl (meta)acrylate and a vinyl ester are preferred, and ethyl acrylate and vinyl acetate are more preferred.

That is, in one aspect of the present embodiment, the crosslinked polyethylene-based resin may comprise an ethylene-vinyl acetate copolymer or an ethylene-ethyl acrylate copolymer.

For the degree of crosslinking of the crosslinked polyethylene-based resin, the gel fraction is preferably 40% or more and more preferably 50% or more. The upper limit of the gel fraction is not particularly limited, but may be, for example, 95% or less. The gel fraction is a value measured in accordance with JASO D618 (2008).

The content percentage of the "copolymer of an α-olefin having a carbonyl group and ethylene" in the covering layer is preferably no less than 14% by mass and no more than 46% by mass, and more preferably no less than 15% by mass and no more than 30% by mass.

The flame retardant contained in the covering layer is not particularly limited as long as it is a conventionally known flame retardant, and examples of such a flame retardant include a halogen-based flame retardant such as a bromine-based flame retardant (such as decabromodiphenylethane) and a chlorine-based flame retardant; a metal hydroxide; a nitrogen-based flame retardant; and a phosphorus-based flame retardant. The content percentage of the above-described flame retardant in the covering layer is preferably no less than 10% by mass and no more than 70% by mass, and more preferably no less than 35% by mass and no more than 55% by mass.

The above-described covering layer has preferably a tensile strength of no less than 8 MPa and no more than 20 MPa, and more preferably no less than 10 MPa and no more than 20 MPa. The tensile strength can be determined in accordance with JASO D618 (2008). More specifically, a core wire is first removed from an electrically insulated cable to take out only the covering layer. The portion of covering layer taken out is then subjected to a tensile test at 500 mm/min with a tensile tester in accordance with JASO D618 (2008), to determine a maximum load. The value obtained by dividing the determined maximum load by the cross-sectional area of the covering layer is taken as a tensile strength.

The covering layer has an elastic modulus (E150) at 150° C. of no less than 0.5 MPa and no more than 5 MPa and more preferably no less than 1 Pa and no more than 4 MPa. The elastic modulus of the covering layer can be determined by measurement in accordance with the test method for dynamic mechanical characteristics described in JIS-K7244-4 (1999). More specifically, the elastic modulus is determined, for the covering layer that has been taken out from the electrically insulated cable according to the above-described method, in a temperature range of—100° C. to 200° C. in a tensile mode, at a temperature rise rate of 10° C./min, a frequency of 10 Hz and a strain of 0.08%, with DVA-220 manufactured by IT Measurement Control Co., Ltd.

The covering layer has an elastic modulus (E200) at 200° C. of no less than 0.5 MPa and no more than 5 MPa and more preferably no less than 0.96 MPa and no more than 3.5 MPa.

The covering layer preferably has a ratio of an elastic modulus at 150° C. to an elastic modulus at 200° C. (E150/E200) of 1.5 or less, more preferably no less than 1 and no more than 1.5, and even more preferably no less than 1 and no more than 1.3.

Figure 2:
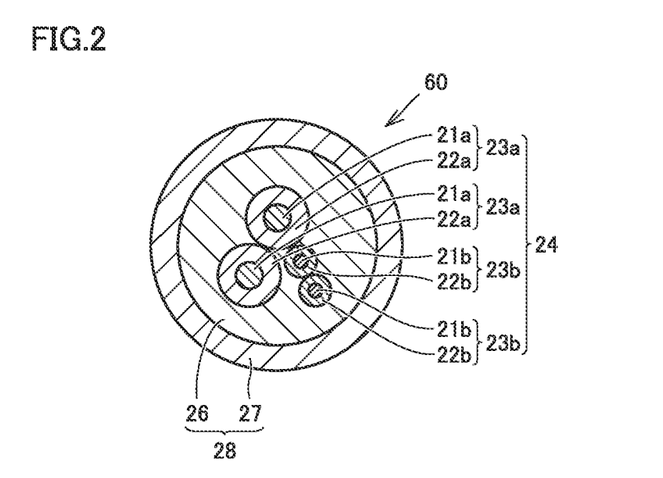
FIG. 2 is a cross-sectional view showing a configuration of another embodiment of the electrically insulated cable of the present disclosure.
Figure 3:
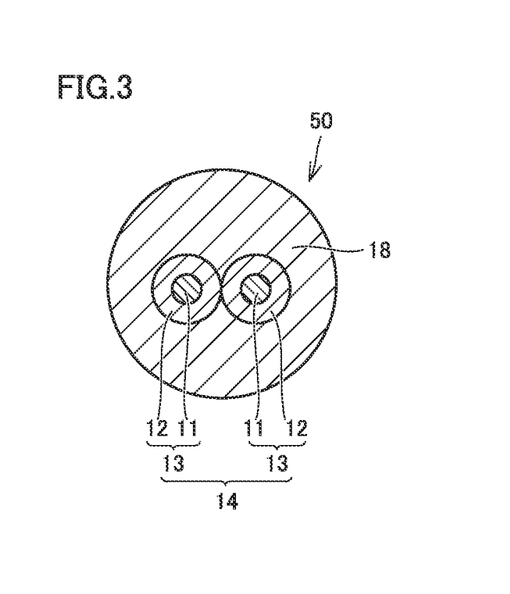
FIG. 3 is a cross-sectional view showing a configuration of further another embodiment of the electrically insulated cable of the present disclosure.

The covering layer may be composed of a single layer (see, for example, FIG. 3). The covering layer may be composed of two or more layers. That is, the covering layer may include a first sheath layer covering the core electric wire and a second sheath layer covering the first sheath layer. For example, an electrically insulated cable to be mounted on a vehicle such as a cable for EPB or a cable for ABS can have a two-layer structure in which a covering layer is comprised of a first sheath layer covering the core electric wire and a second sheath layer covering the first sheath layer (see FIGS. 1 and 2).

(First Sheath Layer)

In order to improve the flexibility of the electrically insulated cable, the material constituting the first sheath layer is preferably a material excellent in flexibility. Particularly, when the elastic modulus of the first sheath layer in a low temperature environment is large, the flexing resistance of the electrically insulated cable in a low temperature environment tends to decrease. Therefore, in order to improve the flexing resistance of the electrically insulated cable in a low temperature environment, the material for the first sheath layer to be used is preferably a material flexible in a low temperature environment. In the case of the electrically insulated cable to be mounted on a vehicle, the material for the first sheath layer is further desired to be excellent in wear resistance, heat resistance or the like and it is often also desired to have flame retardance.

Examples of the material constituting the first sheath layer include a polyolefin-based resin such as polyethylene and an ethylene-vinyl acetate copolymer resin (EVA), a polyurethane elastomer, a polyester elastomer and a resin obtained by mixing these. By forming the first sheath layer out of a polyolefin-based resin, the electrically insulated cable can be improved in flexibility and flexing resistance in a low temperature environment. By forming the first sheath layer out of a polyurethane elastomer, the electrically insulated cable can be improved in wear resistance. By forming the first sheath layer out of a polyester elastomer, the electrically insulted cable can be also improved in heat resistance. Among the above-described resins, the polyethylene-based resin is particularly preferred from the viewpoint of a manufacturing cost and the like.

The material constituting the first sheath layer to be used can be a resin containing very low-density polyethylene (VLDPE) as a main component and having a small ratio between the elastic modulus in a low temperature environment and the elastic modulus in a high temperature environment. By using such a resin, it is possible to manufacture an electrically insulated cable having an excellent flexing resistance in a wide temperature range from room temperature to a low temperature. The resin containing VLDPE as a main component may be blended with other resins such as EVA, an ethylene-ethyl acrylate copolymer resin (EEA) and an acid-modified VLDPE, as long as the effects of the present disclosure are exhibited.

The material for forming the first sheath layer may contain various additives such as an antioxidant, a colorant and a flame retardant, as long as the effects of the present disclosure are exhibited.

When the electrically insulated cable is a power wire (such as a cable for EPB) used for power supply applications, the thickness of the first sheath layer is usually preferably no less than 0.3 mm and no more than 1.5 mm and more preferably no less than 0.45 mm and no more than 1.2 mm. As used herein, the "thickness of the first sheath layer" means the shortest distance from the inner wall of the first sheath layer to the interface between the first sheath layer and the second sheath layer. The thickness of the first sheath layer can be measured using a slide caliper or a micrometer gauge in the same manner as described above (average value of 10-point measurements).

(Second Sheath Layer)

The second sheath layer covers the above-described first sheath layer. In one aspect of the present embodiment, the second sheath layer can also be understood to be a layer in the front surface side of the covering layer. The second sheath layer preferably contains a crosslinked polyethylene-based resin and a flame retardant. By defining in this way, the electrically insulated cable can have an excellent shape retention and an excellent workability. As the crosslinked polyethylene-based resin and the flame retardant contained in the second sheath layer, those described above can be used.

When the electrically insulated cable is a power wire (such as a cable for EPB) used for power supply applications, the thickness of the second sheath layer is usually preferably no less than 0.1 mm and no more than 0.7 mm. As used herein, the "thickness of the second sheath layer" means the shortest distance from the interface between the first sheath layer and the second sheath layer to the outer wall of the second sheath layer. The thickness of the second sheath layer can be measured using a slide caliper or a micrometer gauge in the same manner as described above (average value of 10-point measurements).

<Tape Member>

The tape member may cover the above-described core electric wire. In one aspect of the present embodiment, it can also be understood that the tape member is arranged between the core electric wire and the covering layer. It can also be understood that the tape member winds around the outer circumference of the core electric wire (the outer circumference of the assembly of insulated wires).

The tape member usually winds around the outer circumference of the core electric wire, and in this case, ease of winding is desired. The thickness and shape (such as width) of the tape member and the material for forming the tape member are preferably selected in consideration of strength and ease of winding.

From the above viewpoint, examples of the material constituting the tape member include paper, a nonwoven fabric, cellulose, polyethylene terephthalate and polyethylene. Among them, the tape member more preferably comprises paper, a nonwoven fabric or polyethylene terephthalate. Examples of the tape member comprised of cellulose include cellophane.

The thickness of the tape member is preferably no less than 3 μm and no more than 200 μm. When the thickness is thinner than 3 μm, the tape member tends to be easily stretched when wound around the core electric wire on the outer circumference thereof. When the thickness is thicker than 200 μm, the rigidity of the tape member is high and the tape tends to easily spread even when wound, and the outer diameter of the covering layer that is covered after winding tends to become unstable. The thickness of the tape member can be measured, for example, by a micrometer gauge with a columnar spindle having a flat tip and a diameter of 10 mm. At this time, the thickness is first measured at each of arbitrarily selected 10 points of the tape member, and the average value of the thicknesses measured at the selected 10 points is taken as the thickness of the tape member.

Embodiments of Electrically Insulated Cable of the Present Disclosure

Hereinafter, more specific embodiments of the above-described electrically insulated cable will be described.

Embodiment 1

FIG. 1 is a cross-sectional view showing Embodiment 1 of the electrically insulated cable of the present disclosure. An electrically insulated cable 50 shown in FIG. 1 is an electrically insulated cable used as a cable for EPB. Electrically insulated cable 50 has a core electric wire 14 formed by twisting together two twisted insulated wires 13. A covering layer 18 covering core electric wire 14 is comprised of a first sheath layer 16 and a second sheath layer 17.

In FIG. 1, insulated wires 13 are each comprised of a conductor 11 and an insulating layer 12 covering conductor 11. Conductor 11 is a twisted twisted wire (a total of 504 element wires) formed by forming 72 twisted wires using element wires, made from a copper alloy, having an outer diameter of 0.08 mm and further twisting the seven twisted wires. The outer diameter of conductor 11 is approximately 2.4 mm. Insulating layer 12 comprised of a flame-retardant polyethylene covers conductor 11 on the outer circumference thereof. The thickness of insulating layer 12 is approximately 0.3 mm. Core electric wire 14 is formed by twisting together the two insulated wires 13 thus formed.

First sheath layer 16 is comprised of an ethylene-vinyl acetate copolymer resin (EVA resin). The thickness of first sheath layer 16 is approximately 0.45 mm. Second sheath layer 17 is comprised of a crosslinked polyethylene-based resin and a flame retardant. The thickness of second sheath layer 17 is approximately 0.5 mm. The material constituting first sheath layer 16 is not limited to EVA resin, but the material to be used is preferably a resin that improves flame retardance, wear resistance and flexing resistance (flexibility) of the electrically insulated cable. The material constituting second sheath layer 17 to be used is preferably a resin particularly excellent in flame retardance, flaw resistance and flexing resistance (flexibility). The outer diameter of electrically insulated cable 50 is approximately 8 mm to 9 mm.

Embodiment 2

FIG. 2 is a cross-sectional view showing another example of the embodiment of the electrically insulated cable of the present disclosure. An electrically insulated cable 60 shown in FIG. 2 is an electrically insulated cable used as a cable for EPB and ABS. Electrically insulated cable 60 has a core electric wire 24 formed by twisting together four insulated wires (two insulated wires 23a and two insulated wires 23b). A covering layer 28 covering core electric wire 24 is comprised of a first sheath layer 26 and a second sheath layer 27.

In FIG. 2, insulated wires 23a are each comprised of a conductor 21a and an insulating layer 22a covering conductor 21a. Conductor 21a is a twisted twisted wire (a total of 504 element wires) formed by forming 72 twisted wires using element wires, made from a copper alloy, having an outer diameter of 0.08 mm and further twisting the seven twisted wires. The outer diameter of conductor 21a is approximately 2.4 mm. Insulating layer 22a comprised of a flame-retardant polyethylene and having a thickness of approximately 0.3 mm covers conductor 21a on the outer circumference thereof. Insulated wire 23a transmits electric power for EPB. On the other hand, insulated wires 23b are each comprised of a conductor 21b and an insulating layer 22b covering conductor 21b. Conductor 21b is a twisted wire formed by twisting together 60 element wires, made of a copper alloy, having an outer diameter of approximately 0.08 mm. The outer diameter of conductor 21b is approximately 0.72 mm. Insulating layer 22b comprised of a flame-retardant polyethylene and having a thickness of approximately 0.3 mm covers conductor 21b on the outer circumference thereof. Insulated wire 23b transmits electric power for ABS. Core electric wire 24 is formed by twisting together the two insulated wires 23a and the two insulated wires 23b thus formed.

The thickness of first sheath layer 26 can be as the same thickness as that of first sheath layer 16 of Embodiment 1, and the same material as the material for forming first sheath layer 16 can be used as a material for forming first sheath layer 26. The thickness of second sheath layer 27 can be as the same thickness as that of second sheath layer 17 of Embodiment 1, and the same material as the material for forming second sheath layer 17 can be used as a material for forming second sheath layer 27. The outer diameter of electrically insulated cable 60 is approximately 8 mm to 9 mm.

Hereinbefore, the electrically insulated cable according to the present embodiment has been described in detail. The above-described electrically insulated cable is used as a member for making an electrical connection in various devices. The above-described electrically insulated cable is suitably used as an electrically insulated cable to be mounted on a vehicle, particularly as a cable that is used in such applications as an electric parking brake (EPB) system and an antilock brake system (ABS). That is, the above-described electrically insulated cable is preferably an electrically insulated cable for an electric parking brake. In addition, the above-described electrically insulated cable is preferably an electrically insulated cable for an antilock brake system.

<<Manufacturing Method of Electrically Insulated Cable>>

Figure 5:
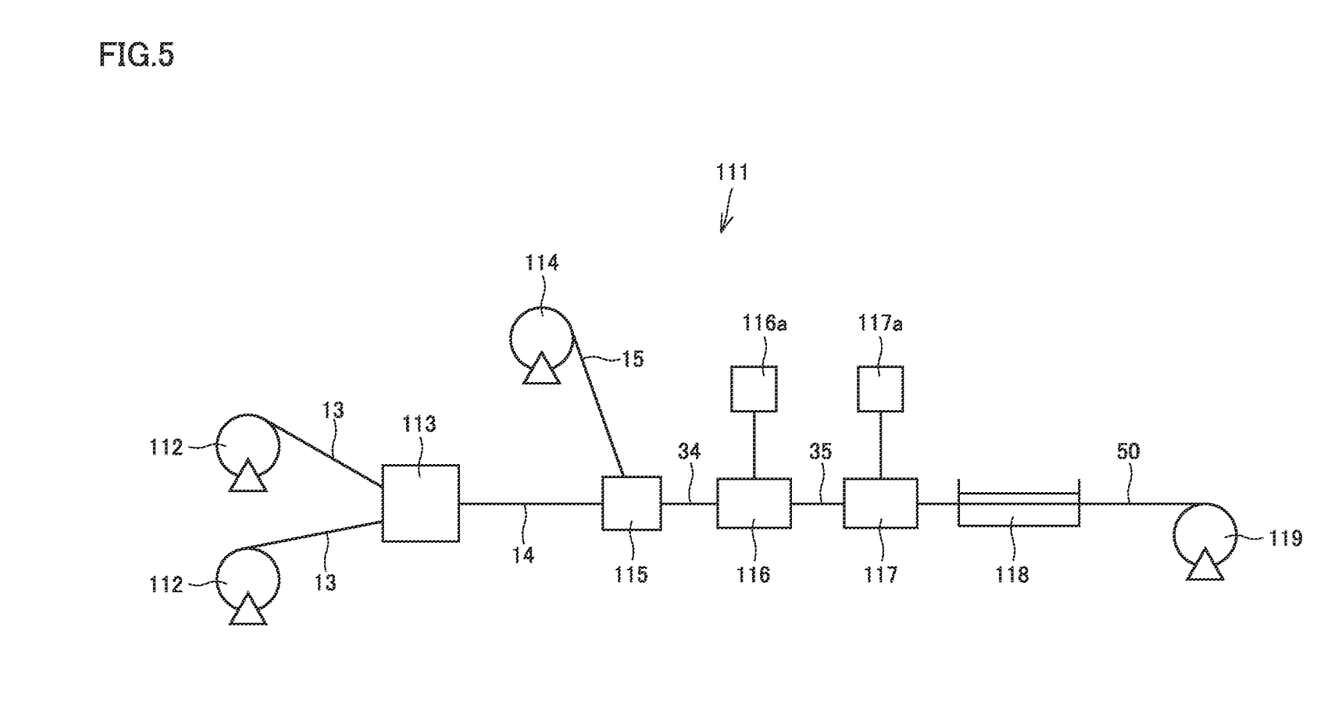
FIG. 5 is a schematic configuration diagram showing a manufacturing apparatus for manufacturing an electrically insulated cable according to one aspect of the present embodiment.

Next, a method for manufacturing an electrically insulated cable of the present disclosure will be described. FIG. 5 is a schematic configuration diagram showing a manufacturing apparatus for manufacturing an electrically insulated cable according to one aspect of the present embodiment. As shown in FIG. 5, a manufacturing apparatus 111 comprises, for example, two insulated wire supply reels 112, a twisting section 113, a tape member supply reel 114, a tape member-winding section 115, a first sheath layer-covering section 116, a second sheath layer-covering section 117, a cooling section 118, and an electrically insulated cable winding reel 119.

An insulated wire 13 is wound around each of two insulated wire supply reels 112, and two insulated wires 13 are supplied to twisting section 113. Here, insulated wire 13 can be manufactured by covering conductor 11 as described above on the outer circumference thereof with an insulating resin which is a material constituting an insulating layer 12 (hereinafter sometimes referred to as "insulating resin"). Covering with the insulating resin can be carried out by the same method as in the case of manufacturing any known insulated electric wire, for example, by melt extruding the insulating resin. After the insulating layer is formed, the resin forming the insulating layer may be crosslinked, for example, by irradiating it with ionizing radiation in order to improve the heat resistance of the insulating layer.

In twisting section 113, two insulated wires 13 supplied are twisted together to form a core electric wire 14. This core electric wire 14 is transferred to tape member-winding section 115.

In tape member-winding section 115, core electric wire 14 transferred from twisting section 113 and tape member 15 supplied from tape member supply reel 114 are merged, and tape member 15 is spirally wound around core electric wire 14 on the outer circumference thereof to form a tape-wound core electric wire 34. This tape-wound core electric wire 34 is transferred to a first sheath layer-covering section 116.

First sheath layer-covering section 116 is connected to a storage section 116a in which a resin material such as a polyethylene resin is stored. In first sheath layer-covering section 116, the resin material supplied from this storage section 116a is extruded on the outer circumference of tape-wound core electric wire 34 and covers tape-wound core electric wire 34. In this way, first sheath layer 16 is formed so as to cover tape-wound core electric wire 34 on the outer circumference thereof. First sheath layer 16-covered, tape-wound core electric wire 35 is transferred to a second sheath layer-covering section 117.

Second sheath layer-covering section 117 is connected to a storage section 117a in which a resin material such as a polyethylene-based resin and a flame retardant are stored. In second sheath layer-covering section 117, the resin material supplied from this storage section 117a is extruded on the outer circumference of first sheath layer 16 formed by first sheath layer-covering section 116 and covers first sheath layer 16. In this way, second sheath layer 17 is formed so as to cover first sheath layer 16 on the outer circumference thereof, to form an electrically insulated cable 50 that is covered with a covering layer 18 of a bilayer structure comprised of first sheath layer 16 and second sheath layer 17. After second sheath layer 17 is formed, second sheath layer 17 is irradiated with an electron beam or the like in order to crosslink a resin of second sheath layer 17. This electrically insulated cable 50 is transferred to cooling section 118, in which covering layer 18 is cooled and cured, and thereafter transferred to cable winding reel 119 for winding.

The above-described manufacturing apparatus may not comprise tape member supply reel 114 and tape member-winding section 115.

EXAMPLE

Hereinafter, the present disclosure will be specifically described based on the examples thereof, but the present invention will not be limited to the following examples.

<<Manufacturing of Electrically Insulated Cable>>
<Preparation of Materials>

The following materials were prepared to produce an electrically insulated cable.

1) A material for forming an insulating layer: a flame-retardant polyethylene-based resin (manufactured by RIKEN TECHNOS CORPORATION; trade name: ANQ9729T)
2) A material for forming a covering layer:
   Polyurethane A: Elastollan ET880, manufactured by BASF
   Polyurethane B: Elastollan ET885, manufactured by BASF
   Polyethylene A (PE_A): ENGAGE 8440, manufactured by Dow Inc.
   Polyethylene B (PE_B): TAFMER DF810, manufactured by Mitsui Chemicals, Inc.
   An ethylene-ethyl acrylate copolymer resin (EEA): REXPEARL A4250, manufactured by Japan Polyethylene Corporation
   An ethylene-vinyl acetate copolymer resin (EVA): EVAFLEX EV360, manufactured by DuPont-Mitsui Polychemicals Co. Ltd. (presently, DOW-MITSUI POLYCHEMICALS CO., LTD.)
   A bromine-based flame retardant: SAYTEX 8010, manufactured by Albemarle Corporation
   Antimony trioxide: PATOX-M, manufactured by Nihon Seiko Co., Ltd.
   An antioxidant: Irganox 1010, manufactured by BASF
   A crosslinking aid: TD1500s, manufactured by DIC Corporation <Production of Electrically Insulated Cable>

An element wire, made of a copper alloy, having an outer diameter of 0.08 mm was prepared. The seventy-two element wires were twisted together to produce a twisted wire, and the seven twisted wires were twisted together to produce a twisted twisted wire. The diameter of the conductor (twisted twisted wire) was 2.4 mm. A flame-retardant polyethylene-based resin was melt extruded on the conductor on the outer circumference thereof to form an insulating layer having a thickness of 0.3 mm, so as to produce an insulated wire.

The two insulated wires produced were twisted together to produce a core electric wire. Each of resin materials having a formulation composition shown in Table 1 was melt extruded on the outer circumference of the produced core electric wire to cover it therewith, so as to form a covering layer having a thickness of 1.0 mm. The resin component of the covering layer was crosslinked by irradiating it with an electron beam of 180 kGy. Samples of the electrically insulated cables with Sample Numbers 1 to 10 were prepared by the above procedure. Here, Sample Numbers 3 to 10 correspond to the examples. Sample Numbers 1 and 2 correspond to comparative examples.

<Evaluation of Material Characteristics>
(Tensile Strength)

The tensile strength test was carried out in accordance with JASO D618 (2008). More specifically, a core wire was first removed from an electrically insulated cable to take out only the covering layer. The portion of covering layer taken out was then subjected to a tensile test at 500 mm/min with a tensile tester in accordance with JASO D618 (2008), to determine a maximum load. The value obtained by dividing the determined maximum load by the cross-sectional area of the covering layer was taken as a tensile strength. The results are shown in Table 1.

<Elastic Modulus>

The elastic modulus E of the covering layer in the electrically insulated cable of Sample Numbers. 1 to 10 were measured in accordance with the test method for dynamic mechanical characteristics described in JIS-K7244-4 (1999). That is, the elastic modulus at 150° C. and the elastic modulus at 200° C. (each abbreviated as "E150" and "E200") were each determined from the storage elastic modulus that had been measured in a temperature range of—100° C. to 200° C. in a tensile mode under the conditions of a temperature rise rate of 10° C./min, a frequency of 10 Hz and a strain of 0.08%, with a viscoelasticity measuring apparatus ("DVA-220", manufactured by IT Measurement Control Co., Ltd.). Table 1 shows E150, E200 and the ratio of an elastic modulus at 150° C. to an elastic modulus at 200° C. (E150/E200), determined for each sample.

<Flexing Test after Battery Fluid Resistance Test>

Figure 6:
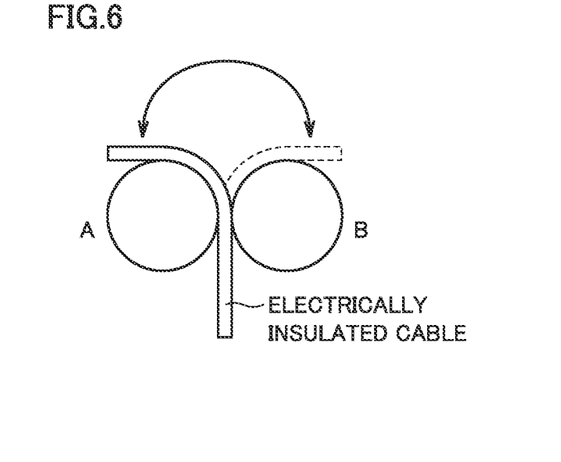
FIG. 6 is a diagram schematically showing the method of the flexing test in the following Example.

A flexing test after a battery fluid resistance test was carried out according to the following procedure. Each of the electrically insulated cables of Sample Numbers 1 to 10 was subjected to a battery fluid resistance test. The battery fluid resistance test was carried out in accordance with JASO D618. Specifically, a battery fluid was first dropped on each of the electrically insulated cable to allow it to stand in a temperature-controlled bath at 90° C. for 8 hours. Thereafter, the battery fluid was dropped on the same place to allow it to stand in a temperature-controlled bath at 90° C. for 16 hours. This was set as one cycle, and a total of two cycles were carried out. Thereafter, as shown in FIG. 6, each of the electrically insulated cables after subjected to the battery fluid resistance test was passed, between two mandrels having a diameter of 60 mm arranged horizontally and parallel to each other, in the vertical direction thereof; and the operation of flexing the upper end of the electrically insulated cable by 90° horizontally so as to abut on the upper side of one mandrel A and then flexing it by 90° in the opposite direction so as to abut on the upper side of the other mandrel B was repeated. The test conditions were such that a downward load of 20 kg was applied to the lower end of the electrically insulated cable, the temperature was −30° C. and the flexing frequency was 60 times/minute. In this test, after flexing the electrically insulated cable 10,000 times, the state of the covering layer in the electrically insulated cable was observed. The covering layer was rated as "A" when no crack was observed in the covering layer and as "B" when cracks could be observed in the covering layer. The results are shown in Table 1 (battery fluid resistance test+flexing test).

<Measurement of Load for Sheath Removal>

The evaluation was made by making a notch in the covering layer (sheath) in the electrically insulating cable with a V-shaped blade and measuring the load when tearing the covering layer off. The electrically insulating cable was judged to be good when the load was 20 kg or less. That is, the electrically insulating cable was evaluated to be excellent in workability when the load was 20 kg or less. The results are shown in Table 1.

<Evaluation of Water Shut-Off Performance with Rubber Stopper>

First, an annular waterproof silicone rubber stopper having an inner diameter by 20% smaller than the outer diameter of the electrically insulated cable was produced. Thereafter, the waterproof silicone rubber stopper was fitted to each of the electrically insulated cables of Sample Numbers 1 to 10 at an end thereof, and a connector housing was formed on the outside thereof to form a waterproof connector. After placing the waterproof connector in a heat resistance tester at 120° C. for 1,000 hours, the terminal end of the housing was sealed, and compressed air was fed at 0.2 MPa from the rear end of the electric wire in water, so as to check whether or not air bubbles were generated from the waterproof rubber stopper portion. The electrically insulated cable was rated as "A" when no air babble was observed and as "B" when air bubbles could be observed. In the present test, when no air bubble is observed, the covering layer in the electrically insulated cable sufficiently retains its shape against the stress applied from the waterproof silicone rubber stopper, and it is judged that the water shut-off properties are exhibited. That is, the electrically insulated cable rated as A can be evaluated to be excellent in shape retention. The results are shown in Table 1.

TABLE 1

| | Sample Number | 1 | 2 | 3 | 4 | 5 | 6 | 7 | 8 | 9 | 10 |
|---|---|---|---|---|---|---|---|---|---|---|---|
| Formulation composition of covering layer (parts by mass) | Polyurethane A | 100 | — | — | — | — | — | — | — | — | — |
| | Polyurethane B | — | 100 | — | — | — | — | — | — | — | — |
| | PE_A | — | — | 100 | — | — | — | 50 | 50 | — | — |
| | PE_B | — | — | — | 100 | — | — | — | — | 50 | 50 |
| | EEA | — | — | — | — | 100 | — | 50 | — | 50 | — |
| | EVA | — | — | — | — | — | 100 | — | 50 | — | 50 |

TABLE 1-continued

| Sample Number | | 1 | 2 | 3 | 4 | 5 | 6 | 7 | 8 | 9 | 10 |
|---|---|---|---|---|---|---|---|---|---|---|---|
| | Bromine-based flame retardant | 20 | 20 | 20 | 20 | 20 | 20 | 20 | 20 | 20 | 20 |
| | Antimony trioxide | 10 | 10 | 10 | 10 | 10 | 10 | 10 | 10 | 10 | 10 |
| | Antioxidant | 2 | 2 | 2 | 2 | 2 | 2 | 2 | 2 | 2 | 2 |
| | Crosslinking aid | 3 | 3 | 3 | 3 | 3 | 3 | 3 | 3 | 3 | 3 |
| | Irradiation dose (kGy) | 180 | 180 | 180 | 180 | 180 | 180 | 180 | 180 | 180 | 180 |
| Material characteristics | Tensile strength (MPa) | 44.1 | 68.4 | 18.6 | 12.3 | 14.9 | 13.2 | 16.3 | 15.8 | 13.5 | 12.4 |
| | Elastic modulus @150° C. E150 (MPa) | 3.7 | 11.2 | 1.2 | 3.99 | 1.6 | 1.3 | 1.4 | 1.3 | 2.31 | 2.12 |
| | Elastic modulus @200° C. E200 (MPa) | 0.65 | 0.79 | 0.96 | 3.50 | 1.1 | 0.92 | 1 | 1.1 | 1.89 | 1.76 |
| | E150/E200 | 5.69 | 14.18 | 1.25 | 1.14 | 1.45 | 1.41 | 1.4 | 1.18 | 1.22 | 1.20 |
| Battery fluid resistance test + flexing test | | B | B | A | A | A | A | A | A | A | A |
| Load for sheath removal (kg) | | 30 | 35 | 12 | 8 | 10 | 8 | 12 | 12 | 10 | 10 |
| Water shut-off performance with rubber stopper | | B | B | A | A | A | A | A | A | A | A |

From the results in Table 1, for the electrically insulated cables of Sample Numbers 3 to 10, a load for sheath removal was 12 kg or less, which was a good result. All of the electrically insulated cables of Sample Numbers 3 to 10 were also rated as A for their water shut-off performance with a rubber stopper. On the other hand, for the electrically insulated cables of Sample Numbers 1 and 2, a load for sheath removal was 30 kg or more, and the electrically insulated cables were rated as B for their water shut-off performance with a rubber stopper. From the above, it has been found that each of the electrically insulated cables of Sample Numbers 3 to 10 has an excellent workability and an excellent shape retention.

In addition, the electrically insulated cables of Sample Numbers 3 to 10 were rated as A in the flexing test after the battery fluid resistance test, and it has been found that they are excellent in durability against a battery fluid.

The embodiments and examples now disclosed are exemplary in all respects, and should be considered not to be restrictive. The scope of the present invention is defined by the claims rather than the embodiments and examples described above, and is intended to include the equivalents to the claims and all modifications within the scope of the claims.

REFERENCE SIGNS LIST 11, 21a, 21b: conductor; 12, 22a, 22b: insulating layer; 13, 23a, 23b: insulated wire; 14, 24: core electric wire; 15, 25: tape member; 16, 26: first sheath layer; 17, 27: second sheath layer; 18, 28: covering layer, 34: tape-wound core electric wire; 35: first sheath layer-covered, tape-wound core electric wire; 50, 60: electrically insulated cable; 111; manufacturing apparatus; 112: insulated wire supply reel; 113: twisting section; 114: tape member supply reel; 115: tape member-winding section; 116: first sheath layer-covering section; 117: second sheath layer-covering section; 116a, 117a: storage section; 118: cooling section; 119: electrically insulated cable winding reel.

The invention claimed is:

1. An electrically insulated cable comprising:
a core electric wire; and
a covering layer covering the core electric wire;
wherein:
the core electric wire includes a plurality of insulated wires;
the insulated wires each include a conductor and an insulating layer covering the conductor;
the covering layer contains a crosslinked polyethylene-based resin and a flame retardant in the front surface side thereof, and
the covering layer has a tensile strength of no less than 8 MPa and no more than 20 MPa.

2. An electrically insulated cable comprising:
a core electric wire; and
a covering layer covering the core electric wire;
wherein:
the core electric wire includes a plurality of insulated wires;
the insulated wires each include a conductor and an insulating layer covering the conductor;
the covering layer contains a crosslinked polyethylene-based resin and a flame retardant in the front surface side thereof, and
the covering layer has a ratio of the elastic modulus at 150° C. to the elastic modulus at 200° C. of 1.5 or less.

3. The electrically insulated cable according to claim 1, wherein the crosslinked polyethylene-based resin comprises an ethylene-vinyl acetate copolymer or an ethylene-ethyl acrylate copolymer.

4. The electrically insulated cable according to claim 1, wherein the flame retardant is a bromine-based flame retardant.

5. The electrically insulated cable according to claim 1, wherein:
the covering layer includes a first sheath layer covering the core electric wire and a second sheath layer covering the first sheath layer; and
the second sheath layer contains the crosslinked polyethylene-based resin and the flame retardant.

6. The electrically insulated cable according to claim 1, wherein the cross-sectional area of the conductor in each of the insulated wires is no less than 1 mm$^2$ and no more than 3 mm$^2$.

7. The electrically insulated cable according to claim 1, wherein:
the conductor includes no less than 196 and no more than 2450 element wires; and
each of the element wires has a diameter of no less than 40 μm and no more than 100 μm.

8. The electrically insulated cable according to claim 1, which is an electrically insulated cable to be mounted on a vehicle.

9. The electrically insulated cable according to claim 8, which is an electrically insulated cable for an electric parking brake.

10. The electrically insulated cable according to claim 8, which is an electrically insulated cable for an antilock brake system.

11. The electrically insulated cable according to claim 2, wherein the crosslinked polyethylene-based resin comprises an ethylene-vinyl acetate copolymer or an ethylene-ethyl acrylate copolymer.

12. The electrically insulated cable according to claim 2, wherein the flame retardant is a bromine-based flame retardant.

13. The electrically insulated cable according to claim 2, wherein:
the covering layer includes a first sheath layer covering the core electric wire and a second sheath layer covering the first sheath layer; and
the second sheath layer contains the crosslinked polyethylene-based resin and the flame retardant.

14. The electrically insulated cable according to claim 2, wherein the cross-sectional area of the conductor in each of the insulated wires is no less than 1 $mm^2$ and no more than 3 $mm^2$.

15. The electrically insulated cable according to claim 2, wherein:
the conductor includes no less than 196 and no more than 2450 element wires; and
each of the element wires has a diameter of no less than 40 μm and no more than 100 μm.

16. The electrically insulated cable according to claim 2, which is an electrically insulated cable to be mounted on a vehicle.

17. The electrically insulated cable according to claim 16, which is an electrically insulated cable for an electric parking brake.

18. The electrically insulated cable according to claim 16, which is an electrically insulated cable for an antilock brake system.

* * * * *